(12) United States Patent
Wolf et al.

(10) Patent No.: US 10,466,113 B2
(45) Date of Patent: Nov. 5, 2019

(54) TEMPERATURE SENSOR

(71) Applicant: Endress + Hauser Wetzer GmbH + Co. KG, Nesselwang (DE)

(72) Inventors: Georg Wolf, Marktoberdorf (DE); Stephan Wiedemann, Bihlerdorf (DE); Alfred Umkehrer, Hopferau (DE)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 150 days.

(21) Appl. No.: 15/528,900

(22) PCT Filed: Nov. 3, 2015

(86) PCT No.: PCT/EP2015/075526
§ 371 (c)(1),
(2) Date: May 23, 2017

(87) PCT Pub. No.: WO2016/091476
PCT Pub. Date: Jun. 16, 2016

(65) Prior Publication Data
US 2017/0328782 A1    Nov. 16, 2017

(30) Foreign Application Priority Data

Dec. 9, 2014 (DE) .......................... 10 2014 118 206

(51) Int. Cl.
*G01K 1/14* (2006.01)
*G01K 1/18* (2006.01)

(52) U.S. Cl.
CPC .............. *G01K 1/14* (2013.01); *G01K 1/143* (2013.01); *G01K 1/18* (2013.01)

(58) Field of Classification Search
CPC ............. G01K 1/14; G01K 1/143; G01K 1/18
See application file for complete search history.

(56) References Cited

U.S. PATENT DOCUMENTS

| 2,694,930 A | * | 11/1954 | Adams | ..................... G01K 1/14 338/229 |
| 3,175,178 A | * | 3/1965 | Boddy | ..................... G01K 1/14 338/28 |
| 3,535,770 A | * | 10/1970 | Crandell | ................ A47G 21/04 228/165 |

(Continued)

FOREIGN PATENT DOCUMENTS

| DE | 2912930 A1 | 10/1980 |
| DE | 3047696 A1 | 7/1982 |

(Continued)

OTHER PUBLICATIONS

English Machine tranlation of DE 102005040699 B3—to Karger; Jan. 11, 2007.*

(Continued)

*Primary Examiner* — Lisa M Caputo
*Assistant Examiner* — Philip L Cotey
(74) *Attorney, Agent, or Firm* — Bacon & Thomas, PLLC

(57) ABSTRACT

A temperature sensor comprising an elongated hollow body, such as a carrier pipe, a shaped part arranged at one end of the hollow body, and a coupling element which is thermally coupled to a measuring element. The shaped part is used for thermally insulating the coupling element from the hollow body.

20 Claims, 2 Drawing Sheets

(56) References Cited

U.S. PATENT DOCUMENTS

| | | | | | |
|---|---|---|---|---|---|
| 4,538,927 | A | * | 9/1985 | Jochemczyk | G01K 13/002 374/163 |
| 4,572,878 | A | * | 2/1986 | Daugherty | G01K 1/14 374/E1.018 |
| 5,022,766 | A | * | 6/1991 | Phipps | G01K 1/14 236/DIG. 19 |
| 6,485,175 | B1 | * | 11/2002 | Nimberger | G01F 1/36 374/142 |
| 8,191,792 | B2 | * | 6/2012 | Bandoh | G01K 1/143 236/1 C |
| 8,496,377 | B2 | * | 7/2013 | Harr | G01K 1/14 374/163 |
| 8,668,385 | B2 | * | 3/2014 | Matsuo | G01K 1/08 374/148 |
| 2001/0026577 | A1 | * | 10/2001 | Muziol | G01K 1/08 374/185 |
| 2002/0127007 | A1 | * | 9/2002 | Henrie | F24H 9/2021 392/498 |
| 2003/0161381 | A1 | * | 8/2003 | Morbitzer | G01K 5/50 374/208 |
| 2007/0110124 | A1 | * | 5/2007 | Shiraki | G01K 1/08 374/208 |
| 2007/0195857 | A1 | * | 8/2007 | Krishnamurthy | G01K 1/16 374/148 |
| 2008/0307901 | A1 | * | 12/2008 | Knight | G01N 1/2247 73/863.11 |
| 2008/0317093 | A1 | * | 12/2008 | Mau | G01J 5/04 374/120 |
| 2009/0168838 | A1 | * | 7/2009 | Harr | G01K 1/14 374/163 |
| 2011/0041597 | A1 | * | 2/2011 | Pfau | G01F 1/684 73/204.25 |
| 2011/0044374 | A1 | * | 2/2011 | Bergeron | G01K 1/08 374/208 |
| 2013/0186881 | A1 | * | 7/2013 | Nakayama | F24C 7/06 219/494 |
| 2014/0161151 | A1 | * | 6/2014 | Proctor | G01K 1/143 374/147 |
| 2014/0269820 | A1 | * | 9/2014 | Perrault | G01K 1/14 374/54 |
| 2014/0269835 | A1 | * | 9/2014 | Gardner | G01K 13/02 374/179 |
| 2015/0185084 | A1 | * | 7/2015 | Hatlen | G01K 1/08 374/208 |
| 2016/0041044 | A1 | * | 2/2016 | Zhao | G01J 5/06 250/338.1 |

FOREIGN PATENT DOCUMENTS

| | | |
|---|---|---|
| DE | 8317879 U1 | 11/1983 |
| DE | 3346565 A1 | 6/1985 |
| DE | 9209556 U1 | 9/1992 |
| DE | 102005016896 B3 | 10/2006 |
| DE | 102005040699 B3 | 1/2007 |
| DE | 102006003602 A1 | 7/2007 |
| DE | 202015103789 U1 | 7/2015 |
| DE | 102014118206 A1 | 6/2016 |
| EP | 0062936 A1 | 10/1982 |

OTHER PUBLICATIONS

German Search Report, German Patent Office, Munich, DE dated Oct. 5, 2015.
International Search REport, EPO, The Netherlands, dated Feb. 9, 2016.
English Translation of the International Preliminary Report on Patentability, WIPO, Geneva, CH, dated Jun. 22, 2017.

* cited by examiner

TEMPERATURE SENSOR

TECHNICAL FIELD

The invention relates to a temperature sensor—preferably, a surface temperature sensor—and a cap for such a temperature sensor.

BACKGROUND DISCUSSION

A sensor arrangement for measuring the temperature of a surface has, for example, become known from German patent specification DE 102005016896B3. In this case, a heat-conducting cap or a heat-conductive foil is provided for contacting the surface.

Furthermore, from German utility model DE 9209556 U1, a temperature sensor for surface temperature measurements is known, in which temperature sensor the sensor is connected to a contact disk, on which contact disk a poorly heat-conducting connecting piece sits.

SUMMARY OF THE INVENTION

Proceeding therefrom, it is an object of the present invention to propose a simpler design of a temperature sensor, or a cap for such a temperature sensor.

The object is achieved by a temperature sensor and a cap for such a temperature sensor.

With respect to the temperature sensor, the object is achieved by a temperature sensor comprising an elongated hollow body, such as a carrier pipe, a shaped part arranged at one end of the hollow body, and a coupling element which is thermally coupled to a measuring element, wherein the shaped part is used for thermally insulating the coupling element from the hollow body.

The hollow body can, for example, be cylindrical and have a preferably completely constant outer diameter and/or inner diameter, at least in sections. In this case, the outer diameter can, for example, be between 0.4 cm and 0.8 cm. The hollow body is preferably a pipe consisting of a metallic and/or rigid material. The pipe is used in this case for arranging the sensor in a desired position and for accommodating the shaped part, etc.

In this case, the shaped part consists particularly preferably of a material whose thermal conductivity is lower than that of the material of which the coupling element and/or the hollow body consist. The shaped part is in this case arranged at one end of the hollow body and is used to thermally insulate the hollow body from the container to which the temperature sensor is applied, and/or from the coupling element.

In this case, the shaped part is used as, for example, a spacer, which establishes a distance between the coupling element and the hollow body. The shaped part may in this case have, for example, an annular segment, against which the end surface of the hollow body and the end surface of the coupling element rest. Preferably, the end surface of the hollow body and of the coupling element are pressed against this annular segment. This segment of the shaped part is preferably arranged to be flush with the hollow body and/or the coupling element.

Is The temperature sensor in this case is preferably used to detect a surface temperature, such as the surface temperature of a container, in which a measuring substance is located. The container may in this case have an arched surface. The container may, in particular, be a pipe, a duct, or a tank.

The coupling element is used to supply the heat on the surface of the container to the measuring element. In this case, the coupling element may, for example, consist of the same material as the hollow body. The coupling element consists, for example, of copper, silver, or steel. The coupling element preferably has a thermal conductivity between 20 W/mK and 1200 W/mK. On the other hand, the shaped part preferably has a thermal conductivity between 0.02 W/mK and 20 W/mK.

The measuring element may, for example, be a temperature-dependent resistor or a thermocouple. As already mentioned, the measuring element may be connected to—for example, soldered onto—the coupling element.

In one embodiment the shaped part is used as a connecting element between the coupling element and the hollow body or carrier pipe. The coupling element may be connected to the hollow body via the shaped part. For example, at least one connecting means can be provided on the hollow body, which connecting means interacts with at least one connecting means of the shaped part in order to mount the shaped part on the hollow body. The shaped part may additionally have at least one other connecting means in order to mount the coupling element on the shaped part.

In one embodiment of the temperature sensor, the coupling element is arranged on the front side of the temperature sensor. The coupling element may, for example, be a disk. The front side of the temperature sensor can thereby be placed on a container, the surface temperature of which is to be determined or in which container a measuring substance is located, the temperature of which is to be determined.

In another embodiment of the temperature sensor, the coupling element is a cap, which is arranged at one end of the temperature sensor and closes the hollow body.

In another embodiment of the temperature sensor, a measuring element is arranged inside the lumen of the cap. For example, the measuring element may be soldered onto the cap. The cap can, for example, have a bottom and side walls, and the measuring element can be soldered onto the bottom. The lumen is in this case enclosed by the side wall protruding from the bottom of the cap.

In another embodiment of the temperature sensor, the coupling element is used to thermally couple with the surroundings of the temperature sensor on the front side of the temperature sensor.

In another embodiment of the temperature sensor, the coupling element is connected to the hollow body via the shaped part.

In another embodiment of the temperature sensor, the coupling element is mounted on the shaped part, wherein the shaped part in turn is mounted on the hollow body.

In another embodiment of the temperature sensor, the shaped part is connected to the hollow body by means of a press fit.

In another embodiment of the temperature sensor, the shaped part consists of an elastic material—in particular, a heat-resistant elastic material, and preferably a synthetic material, such as a plastic or silicone.

In another embodiment of the temperature sensor, the shaped part has a first segment, which first segment protrudes into the lumen of the hollow body. This segment may have a diameter that essentially corresponds to the inner diameter of the hollow body.

In another embodiment of the temperature sensor, the first segment has ribs that extend along the longitudinal axis of the hollow body.

is In another embodiment of the temperature sensor, the shaped part has a second segment, which second segment protrudes into the lumen of the cap. This segment can have a diameter that essentially corresponds to the inner diameter of the coupling element, such as the cap.

In another embodiment of the temperature sensor, the second segment has ribs that extend along the longitudinal axis of the hollow body.

By means of the first or second segment, a press fit and thus a connection or mounting of the shaped part on the hollow body or the coupling element can thus be established.

In another embodiment of the temperature sensor, the shaped part has a third segment, which is preferably located between the first and the second segments and which adjoins the surface of the hollow body and the cap—preferably, in a flush manner. This may be the aforementioned annular segment.

In another embodiment of the temperature sensor, the shaped part has a continuous opening, through which the measuring element is connected electrically—for example, via connecting lines. The remaining cavity in the coupling element and in the shaped part may, for example, be filled or cast with an—in particular, permanently elastic—casting compound, such as SIL gel or two-component silicone. The measuring element can thereby be protected against an ingress of moisture.

In another embodiment of the temperature sensor, connecting lines used to electrically contact the measuring element are arranged in the hollow body. The connecting lines may, for example, be one or more wires or cables connected to the measuring element. Via these connecting lines, a measurement signal generated by means of the measuring element can be transmitted to an evaluation unit comprising, for example, a measurement signal processing or measured value processing.

is In another embodiment of the temperature sensor, the coupling element on the front side of the temperature sensor is enclosed by the shaped part - for example, surrounded by an edge.

The coupling element in this case has a wall thickness between 0.1 mm and 0.9 mm, at least on the front side of the temperature sensor. Through the suitable selection of the wall thickness, the flexibility, i.e. the elasticity, of the coupling element can be determined. The coupling element can thus adapt to the contour of the surface whose temperature is to be determined. This consequently results in better or quicker response performance by the temperature sensor or by the measuring element of the temperature sensor.

In another embodiment of the temperature sensor, the coupling element is arranged—preferably, in the middle—on the front side of the temperature sensor and closes a part of the front side of the temperature sensor.

In another embodiment of the temperature sensor, the shaped part has at least one side wall, via which side wall the front side is connected to the hollow body. The side wall of the shaped part can in this case correspond to the side wall of the cap, wherein the coupling element is enclosed by the bottom of the cap.

In another embodiment of the temperature sensor, the front side of the temperature sensor is placed on a surface of a container, such as a duct—preferably, by means of a pretensioning force.

In another embodiment of the temperature sensor, the pretensioning force is used to deform the coupling element and at least the edge surrounding the coupling element, and to adapt them to the container. The coupling element is in this case preferably surrounded by the shaped part on the front side of the temperature sensor, e.g., partially extending around the coupling element, and, particularly preferably, completely extending around the coupling element. If the shaped part consists of a flexible material, the coupling element can be adapted by applying a suitable pretensioning to the shape of the surface whose temperature is to be measured. On the other hand, according to the embodiment with a rigid shaped part, which is provided as connecting element between a cap, in which a measuring element is arranged, and a carrier pipe, this cap can also be positioned on a surface by means of a pretensioning force and pressed against this surface. For this purpose, a particularly stiff or rigid connection between the carrier pipe and the cap is advantageous.

With respect to the cap, the object is achieved by a cap for a temperature sensor. The cap can in this case be designed as described above, i.e., comprise, in particular, a thermally-conductive coupling element, wherein an edge that surrounds the coupling element is provided on the front side of the cap. The cap can, furthermore, have a side wall that consists of the same material as the edge and is also, like the edge, a component of the shaped part.

In the present case, a non-flexible or rigid shaped part is thus to be used as a connecting element, according to one embodiment. This connecting element can, for example, consist of a highly temperature-resistant plastic, such as PEEK. The shaped part can, for example, [have] a modulus of elasticity of greater than 1000 MPa—in particular, in case of PEEK, of 3600 MPa.

BRIEF DESCRIPTION OF THE DRAWINGS

The invention is explained in more detail based upon the following drawings.

Illustrated are.

DETAILED DISCUSSION IN CONJUNCTION WITH THE DRAWINGS

Figure 1:
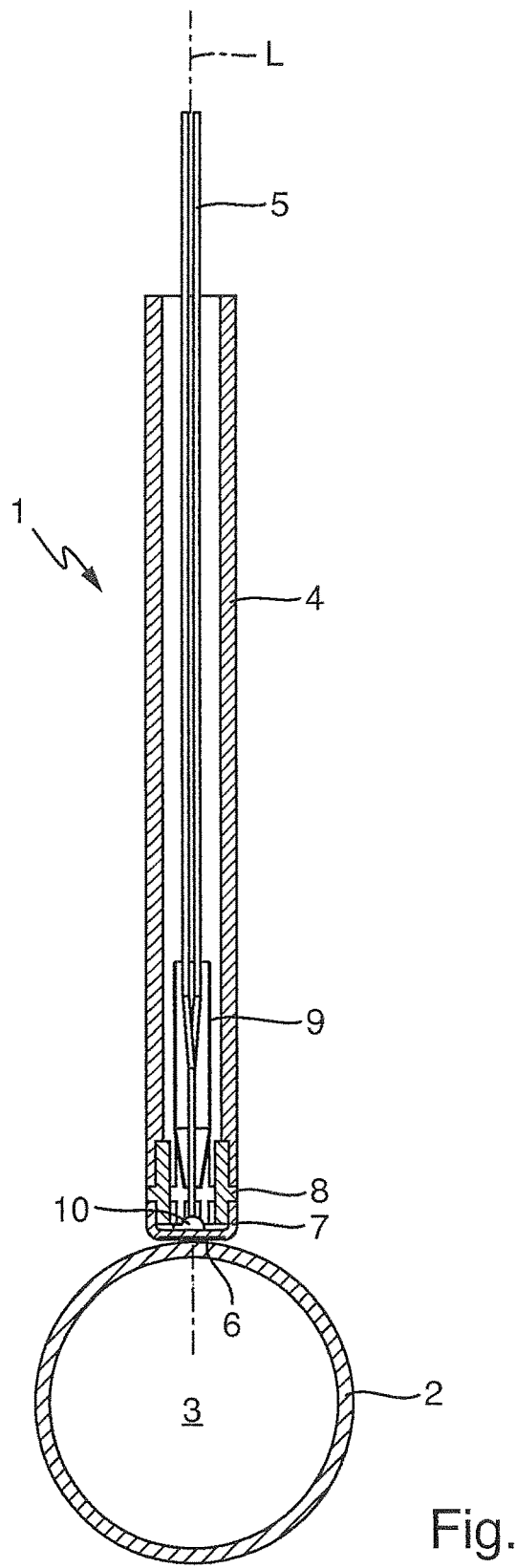
FIG. 1: is a cross-section through a temperature sensor.

FIG. 1 shows a first embodiment of the proposed invention. In this case, a measuring element 10 in the form of a temperature-dependent resistor, such as a PT100 temperature sensor, is provided. The measuring element 10 is soldered into a thin-walled cap 7 that is only a few tenths of a millimeter thick and is used as a coupling element. The cap 7 can, for example, consist of copper. Alternatively, other highly heat-conducting metallic materials, such as a silver alloy, can also be used. The cap 7 is mounted on a pipe section 4 (carrier pipe) made preferably of stainless steel by means of a connecting piece (shaped part) 8 made of poorly heat-conducting material (heat-resistant plastic, such as PEEK or PPS). The pipe 4 can in this case have an outer diameter of, for example, 6 mm. The connection between the cap 7 and the connecting piece (shaped part) 8, and between the connecting piece (shaped part) 8 and the carrier pipe 4, can be carried out by pressing, gluing, casting, or a combination of these measures. The measuring element 10 thus makes direct contact with the thin-walled, highly heat-conducting cap 7. The temperature sensor 1 can, for example, be installed in a thermometer such that the cap 7 makes direct contact with the shell surface (surface) of the pipe (measuring pipe) 2 to be measured. In case of temperature changes, the cap 7 heats up very quickly as a result of its low mass, its low wall thickness, and its high thermal conductivity, e.g., of about 320 W/mK, and transfers the heat very quickly and almost exclusively to the measuring element 10 as a result of the thermal insulation by means of the plastic connecting piece (formed part) 8. The response time is shortest if the measuring element 10 sits in the middle of the measuring pipe 2. In order to optimize the response time even if the measuring element 10 sits somewhat eccentrically on the measuring pipe 2, a highly heat-conductive graphite foil 6 can additionally be applied to the cap 7. The graphite foil 6 quickly transfers the heat of the measuring pipe 2 from the point of contact to the center of the bottom of the cap, on which the measuring element 10 sits. The temperature sensor 1 is in this case designed to be symmetrical about its longitudinal axis L. In addition, a shrinking tube 9 can be provided, in which the connecting lines 5 for electrically contacting the measuring element 10 are arranged.

In the container, which can be a measuring pipe 4 as described, is located a measuring substance 3. Instead of a pipe, a tank can also be provided as container, the surface temperature of which is to be measured.

Figure 2:
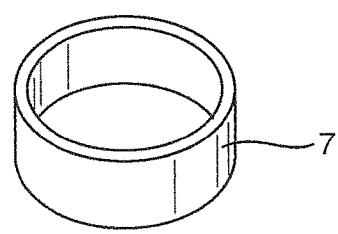
FIG. 2: is an exploded view of the temperature sensor according to FIG. 1.
Figure 2:
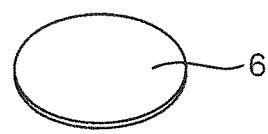

FIG. 2 shows the embodiment according to FIG. 1 in an exploded view. In the carrier pipe 4, the connecting lines 5 are arranged and, in the segment in which these connecting lines are connected to the connection lines of the measuring element 10, a shrinking tube 9 is applied around the connecting lines 5 and/or the connection lines.

The shaped part 8 has a first segment 81, a second segment 82, and a third segment 83. The first segment has, for example, ribs, in order to achieve a press fit of the shaped part in the carrier pipe. For this purpose, the first segment is pushed into the carrier pipe up to a stop—for example, in the carrier pipe and/or the shaped part.

The second segment also has ribs, which are used to achieve a press fit with the coupling element—in this case, a cap 7. In the process, this first segment is then pushed into the cap 7 up to a stop in the cap 7 and/or the shaped part 8.

Between the first and the second segments is arranged a third segment, which is used as a spacer between the coupling element—in this case, the cap 7—and the carrier pipe.

As shown in FIG. 2, the cap 7 has, for example, a cylindrical or pot-like shape. The cap has, for example, a bottom B and a side wall W extending from the bottom, as shown here, in parallel to the longitudinal axis L of the carrier pipe 4.

The measuring element 10 is preferably accommodated in the cap 7 and can, for example, be soldered onto the bottom B of the cap on the inside of the cap 7.

Figure 3:
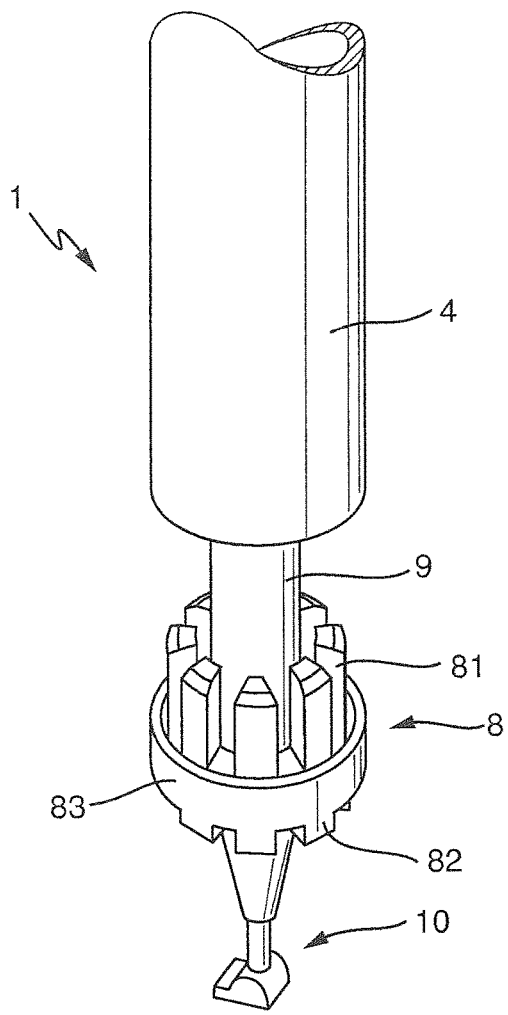
FIG. 3: is a cap for a temperature sensor.
Figure 3:
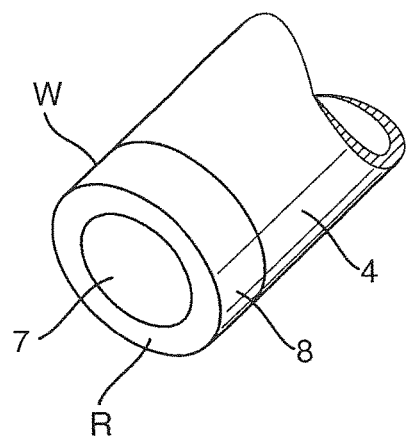

FIG. 3 shows an embodiment of a cap for a temperature sensor 1. The temperature sensor 1 can also be designed such that the measuring element 10 is soldered onto a thin copper sheet—for example, in the shape of a disk 7—or a silver sheet. This coupling element denoted here by the reference symbol 7 is connected to the carrier pipe 4 by means of a shaped part 8, which consists, for example, of a permanently elastic casting compound that has very poor thermal conductivity. As a result of the elasticity of the casting compound, the very thin coupling element 7 with the soldered-on measuring element 10 can be adapted to the surface of the measuring pipe 4. Since the casting compound has very low thermal conductivity, the coupling element 7 with the measuring element 10 is essentially thermally insulated from the carrier pipe 4. As a result of the high is thermal conductivity of the material of which the coupling element 7 consists, such as copper, the small mass of the disk 7, and the insulation from the carrier pipe 7, the coupling element 7 very quickly absorbs heat released from the surface and transfers it very quickly and almost exclusively to the measuring element 10.

The coupling element is, in the present case, also surrounded by an edge R, i.e., enclosed by it. This edge R is in turn connected to the side wall W of the cap. In this case, this cap forms the shaped part 8, which is used to connect the coupling element 7 to the carrier pipe 4.

The invention claimed is:

1. A temperature sensor embodied to measure a surface temperature, comprising:
    a front side at one end of the temperature sensor, wherein said front side is configured to be applied to an outer surface of a container or pipe of which the surface temperature is to be measured,
    an elongated hollow body, a shaped part, a cap, and a measuring element, wherein:
    said cap is thermally coupled to a measuring element,
    said cap is arranged on a measuring side at said front side of the temperature sensor or forms the measuring side at said front side,
    said cap closes said hollow body at said front side and said cap is connected to said hollow body via said shaped part or mounted on said hollow body by means of said shaped part,
    said measuring element is arranged inside a lumen of said cap, and
    said shaped part is arranged at one end of said hollow body, said shaped part thermally insulates said cap from said hollow body at said front side, wherein:
    said shaped part serves as a spacer which establishes a distance between the cap and the hollow body and said shaped part consists of a material whose thermal conductivity is lower than that of a material of which the cap element and the hollow body consist.

2. The temperature sensor according to claim 1, wherein:
    said cap is used to thermally couple with the surroundings of the temperature sensor on the measuring side of the temperature sensor.

3. The temperature sensor according to claim 1, wherein:
    said cap is mounted on said shaped part; and
    said shaped part is mounted on said hollow body.

4. The temperature sensor according to claim 1, wherein:
    said shaped part is connected to said hollow body by means of a press fit.

5. The temperature sensor according to claim 1, wherein:
    said shaped part consists of a heat-resistant elastic material.

6. The temperature sensor according to claim 5, wherein:
    said shaped part consists of a plastic or silicone.

7. The temperature sensor according to claim 1, wherein:
    said shaped part has a first segment, which first segment protrudes into the lumen of said hollow body.

8. The temperature sensor according to claim 7, wherein:
    said first segment has ribs extending along the longitudinal axis of said hollow body.

9. The temperature sensor according to claim 7, wherein:
    said shaped part has a third segment, which is located between said first and said second segments, which third segment adjoins the surface of said hollow body and/or said cap in a flush manner.

10. The temperature sensor according to claim 1, wherein:
    said shaped part has a second segment, which second segment protrudes into the lumen of said cap.

11. The temperature sensor according to claim 10, wherein:
said second segment has ribs extending along the longitudinal axis of said hollow body.

12. The temperature sensor according to claim 1, wherein:
said shaped part has a continuous opening, through which said measuring element is electrically connected via connecting lines.

13. The temperature sensor according to claim 12, wherein:
said connecting lines used to electrically contact said measuring element are arranged in said hollow body.

14. The temperature sensor according to claim 1, wherein:
said cap on the measuring side of the temperature sensor is enclosed by said shaped part.

15. The temperature sensor according to claim 1, wherein:
said cap is arranged on the measuring side of the temperature sensor and closes a part of the measuring side.

16. The temperature sensor according to claim 1, wherein:
said shaped part has at least one side wall, via which side wall the measuring side is connected to said hollow body.

17. The temperature sensor according to claim 16, wherein:
said measuring side of the temperature sensor is placed on said outer surface of said container or pipe of which the surface temperature is to be measured by a pretensioning force.

18. The temperature sensor according to claim 17, wherein:
said pretensioning force is used to deform said cap and at least the edge surrounding said cap, and to adapt them to the container.

19. The temperature sensor according to claim 1, wherein:
said shaped part consists of a synthetic material.

20. A cap for a temperature sensor embodied to measure a surface temperature, the temperature sensor comprising:
a front side at one end of the temperature sensor, wherein said front side is configured to be applied to an outer surface of a container or pipe of which the surface temperature is to be measured,
an elongated hollow body, a shaped part, said cap, and a measuring element, wherein
said cap is thermally coupled to said measuring element, said cap is arranged on a measuring side at said front side of the temperature sensor or forms the measuring side at said front side of the temperature sensor,
said cap closes said hollow body at said front side and said cap is connected to said hollow body via said shaped part or mounted on said hollow body by means of said shaped part,
said measuring element is arranged inside a lumen of said cap, and
said shaped part is arranged at one end of said hollow body, said shaped part thermally insulates said cap from said hollow body at said front side, wherein:
said shaped part serves as a spacer which establishes a distance between the cap and the hollow body and said shaped part consists of a material whose thermal conductivity is lower than that of the material of which the cap element and the hollow body consist.

* * * * *